United States Patent [19]

Koch et al.

[11] Patent Number: 4,654,050

[45] Date of Patent: Mar. 31, 1987

[54] ESTERS OF CARBOXY-CONTAINING INTERPOLYMERS

[75] Inventors: Frederick W. Koch, Willoughby Hills, Ohio; Jeffrey K. Long, Ann Arbor, Mich.

[73] Assignee: The Lubrizol Corporation, Wickliffe, Ohio

[21] Appl. No.: 813,542

[22] Filed: Jan. 3, 1986

Related U.S. Application Data

[63] Continuation-in-part of Ser. No. 692,946, Jan. 18, 1985, abandoned.

[51] Int. Cl.⁴ .............................................. C10L 1/18
[52] U.S. Cl. ........................................... 44/62; 44/70; 525/327.7; 525/384
[58] Field of Search ................ 44/62, 70; 525/327.7, 525/384

[56] References Cited

U.S. PATENT DOCUMENTS

| | | | |
|---|---|---|---|
| 3,085,986 | 4/1963 | Muskat | 525/327.7 |
| 3,329,658 | 7/1967 | Fields | 44/62 |
| 3,374,209 | 3/1968 | Hay et al. | 525/327.7 |
| 3,388,106 | 6/1968 | Muskat | 525/327.7 |
| 3,451,979 | 6/1969 | Muskat | 525/327.7 |
| 3,574,575 | 4/1971 | Gee et al. | 44/62 |
| 4,192,930 | 3/1980 | Beck et al. | 525/327.7 |
| 4,518,509 | 5/1985 | Newberry | 44/62 |

Primary Examiner—Y. Harris-Smith
Attorney, Agent, or Firm—Karl Bozicevic; Denis A. Polyn; Forrest L. Collins

[57] ABSTRACT

An ester of a carboxy-containing interpolymer is disclosed, said interpolymer having an RSV of from about 0.05 to about 2. The esterified polymer will include at least an ester group (A) which is a carboxylic ester group having at least about 8 aliphatic carbon atoms in the ester group with the proviso that if the ester group (A) contains less than 28 carbon atoms, the interpolymer ester will include an ester group which is a carboxylic ester group having an ester group of the formula

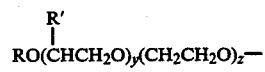

wherein R is a hydrocarbyl group of about 1 to about 50 carbon atoms, R' is a hydrocarbyl group of about 1 to about 50 carbon atoms, y is a number in the range of zero to about 50 and z is a number in the range of zero to about 50 with the proviso that both y and z cannot be zero. The interpolymer may include an ester group (C) which is a carboxylic ester group having no more than 7 aliphatic carbon atoms in the ester group. Crude oil, lubricating oil and fuel compositions and additive concentrates containing such ester are disclosed.

32 Claims, No Drawings

ESTERS OF CARBOXY-CONTAINING INTERPOLYMERS

CROSS-REFERENCE

This application is a continuation-in-part of our copending application, U.S. Ser. No. 692,946, filed Jan. 18, 1985, now abandoned, the disclosure of which is hereby incorporated herein by reference.

TECHNICAL FIELD

This invention relates to esters of carboxy-containing interpolymers which are useful as pour point depressants in crude oil, lubricating oil and fuel compositions, and to additive concentrates containing such esters.

BACKGROUND OF THE INVENTION

The pour point of an oil is defined as the lowest temperature at which the oil will pour or flow when chilled without disturbance under specified conditions. The problems associated with pour point ordinarily have to do with crude oils, heavy oils such as lubricating oils, but the recent increased use of distillate fuel oils have revealed similar problems even with these lighter, more fluid materials. Pour point problems generally arise through the formation of solid or semi-solid waxy particles in the oil.

U.S. Pat. Nos. 3,702,300 and 3,933,761 describe carboxy-containing interpolymers in which some of the carboxy groups are esterified and the remaining carboxy groups are neutralized by reaction with a polyamino compound having one primary or secondary amino group and at least one mono-functional amino group. These patents indicate that such interpolymers are useful as viscosity index improving and antisludge agents in lubricating compositions and fuels.

U.S. Pat. No. 4,284,414 discloses mixed alkyl esters made by reacting a mixture of two or more of certain monohydric alcohols with interpolymers derived from (i) alpha, beta-unsaturated dicarboxylic acids or derivatives thereof and (ii) vinyl aromatic monomers having up to 12 carbon atoms which are useful modifiers for crude oils.

U.S. Pat. No. 3,388,106 discloses copolyemrs of maleic compounds and monoethylenically unsaturated monomers which can be used as a flow-improver.

U.S. Pat. No. 4,518,509 discloses a flow improver for crude oils which are comprised of copolymers of long chain alpha-olefins with an unsaturated dicarboxylic acid, anhydride, or derivative thereof. The copolymer may be used alone or in combination with a low molecular weight linear polyethylene.

Although many pour point depressants have been suggested and many are available in the market, concerted efforts are constantly being made to find new pour point depressants which are more economical and more effective than the depressants heretofore known in the art.

SUMMARY OF THE INVENTION

The present invention relates to novel polymeric esters which are useful as pour point depressants for crude oil, lubricating oil and fuel compositions, as well as additive concentrates containing such esters.

Broadly stated, the present invention contemplates the provision of an ester of a carboxy-containing interpolymer, said interpolymer having an RSV of from about 0.05 to about 2, the ester group or groups of said interpolymer being:

(A) a carboxylic ester group having at least about 8 aliphatic carbon atoms in the ester group; or (B) a carboxylic ester group having an ester group of the formula

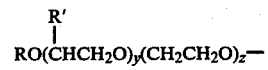

wherein R is a hydrocarbyl group of about 1 to about 50 carbon atoms, R' is a hydrocarbyl group of about 1 to about 50 carbon atoms, y is a number in the range of zero to about 50 and z is a number in the range of zero to about 50 with the proviso that both y and z cannot be zero; with the proviso that an ester group (B) must be present if the ester group (A) contains less than 28 carbon atoms.

The interpolymer may also be esterified with the ester group (C) which is a carboxylic ester group having no more than 7 aliphatic carbon atoms in the ester group. The invention also relates to crude oil, lubricating oil and fuel compositions containing such an ester, as well as additive concentrates containing such an ester.

The term "hydrocarbyl" and related terms such as "hydrocarbon" are used herein to include substantially hydrocarbyl groups (for example, substantially hydrocarbyloxy, substantially hydrocarbylmercapto, etc.), as well as purely hydrocarbyl groups. The description of these groups as being substantially hydrocarbyl means that they contain no non-hydrocarbyl substituents or non-carbon atoms which significantly affect the hydrocarbyl characteristics or properties of such groups relevant to their uses as described herein.

Non-limiting examples of substituents which do not significantly alter the hydrocarbyl characteristics or properties of the general nature of the hydrocarbyl groups of this invention are the following:

Ether groups (especially hydrocarbyloxy such as phenoxy, benzyloxy, methoxy, n-butoxy, etc., and particularly alkoxy groups of up to about 10 carbon atoms);

Oxo groups (e.g., —O— linkages in the main carbon chain);

Nitro groups;

Thioether groups (especially $C_{1-10}$ alkyl thioether);

Thia groups (e.g., —S— linkages in the main charbon chain);

Carbohydrocarbyloxy groups (e.g.,

hydrocarbyl)

Sulfonyl groups (e.g.,

hydrocarbyl)

Sulfinyl groups (e.g.,

hydrocarbyl)

This list is intended to be merely illustrative and not exhaustive, and the omission of a certain class of substituent is not meant to require its exclusion. In general, if such substituents are present, there will not be more than two for each 10 carbon atoms in the substantially hydrocarbyl group and preferably not more than one for each 10 carbon atoms since this number of substituents usually will not substantially affect the hydrocarbyl characteristics and properties of the group. Nevertheless, the hydrocarbyl groups usually will be free from non-hydrocarbon groups due to economic considerations; that is, they will be purely hydrocarbyl groups consisting of only carbon and hydrogen atoms.

The term "lower" as used in the present specification and claims, when used in conjunction with terms such as alkyl, alkenyl, alkoxy, and the like, is intended to describe such groups which contain a total of up to 7 carbon atoms.

One aspect of this invention is the molecular weight of the interpolymer before esterification. The molecular weight is expressed herein and in the appended claims in terms of the "reduced specific viscosity" of the interpolymers which is a recognized means of expressing the molecular size of a polymeric substance. As used herein, and in the appended claims, the reduced specific viscosity (abbreviated as RSV) is the value obtained in accordance with the formula:

$$RSV = \frac{\text{relative viscosity} - 1}{\text{concentration}}$$

wherein the relative viscosity is determined by measuring, by means of a dilution viscometer, the viscosity of a solution of 1 gram of the interpolymer in 100 milliliters of acetone and the viscosity of acetone at $30° \pm 0.02°$ C. For the purpose of computation by the above formula, the concentration is adjusted to 0.4 gram of the interpolymer per 100 ml. of acetone. A more detailed discussion of the reduced specific viscosity, also known as the specific viscosity, as well as its relationship to the average molecular weight of an interpolymer, appears in Paul J. Flory, "Principles of Polymer Chemistry" (1953 edition) pages 208 et seq, which is incorporated herein by reference.

Mixtures of two or more compatible (i.e., nonreactive to one another) interpolymers which are separately prepared are contemplated herein for use in the esterification reaction, if each has a RSV as above described. Thus, as used herein, and in the appended claims, the terminology "interpolymer" refers to either one separately prepared interpolymer or a mixture of two or more of such interpolymers. A separately prepared interpolymer is one in which the reactants and/or reaction conditions are different from the preparation of another interpolymer.

The interpolymers are copolymers, terpolymers, or other interpolymers of (i) at least one aliphatic olefin monomer or vinyl aromatic monomer, and (ii) at least one alpha, beta-unsaturated dicarboxylic acid or derivative thereof. The derivatives of the dicarboxylic acid are derivatives which are polymerizable with the olefin monomers or vinyl aromatic monomers (i), and as such, may be the esters and anhydrides of the acids. The interpolymers that are useful have an RSV in the range of about 0.05 to about 2, preferably about 0.1 to about 2, more preferably about 0.2 to about 0.9, and advantageously about 0.35 to about 0.7. The molar ratio of units of (i) to (ii) being from about 1:2 to about 3:1, preferably about 1:1.

DETAILED DESCRIPTION OF THE INVENTION

The invention is a pour point depressant comprised of a carboxy-containing interpolymer. Accordingly, the major aspects of the invention relate to the interpolymer itself and the various ester groups on the polymer. The esterification groups (A), (B) and (C) vary with the specific results desired. For example, the use of long chain ester groups (A) containing 28 to 100 carbons without (C) but with or without (B) works particularly well with very waxy, high pour point Utah crude oil. With less waxy crudes a shorter chain (A) of about 8-30 carbons is used in combination with an ester group (B) and optionally a group (C) as such groups are defined below.

I(A) THE INTERPOLYMER

Suitable aliphatic olefin monomers that are useful in the preparation of the interpolymers of the invention are mono-olefins of about 2 to about 30 carbon atoms. Included in this group are internal olefins (i.e., wherein the olefinic unsaturation is not in the "1" or alpha position) and the mono-1-olefins or alpha-olefins. The alpha olefins are preferred. Exemplary olefins include ethylene, propylene, 1-butene, isobutene, 1-pentene, 2-methyl-1-butene, 3-methyl-1-butene, 1-hexene, 1-heptene, 1-octene, 1-dodecene, 1-tridecene, 1-tetradecene, 1-pentadecene, 1-hexadecene, 1-heptadecene, 1-octadecene, 1-nonadecene, 1-eicosene, 1-henicosene, 1-docosene, 1-tetracosene, 1-pentacosene, 1-hexacosene, 1-octacosene, 1-nonacosene, etc. Commercially available alpha-olefin can also be used. Exemplary alpha-olefin mixtures include $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{16-20}$ alpha-olefins, $C_{22-28}$ alpha-olefins, etc. Additionally, $C_{30}+$ alpha-olefin fractions such as those available from Gulf Oil Company under the name Gulftene can be used. Preferred olefin monomers include ethylene, propylene and 1-butene.

The mono-olefins can be derived from the cracking of paraffin wax. The wax cracking process yields both even and odd number $C_{6-20}$ liquid olefins of which 85 to 90% are straight chain 1-olefins. The balance of the cracked wax olefins is made up of internal olefins, branched olefins, diolefins, aromatics and impurities. Distillation of the $C_{6-20}$ liquid olefins obtained from the wax cracking process yields fractions (e.g., $C_{15-18}$ alpha-olefins) which are useful in preparing the interpolymers of this invention.

Other mono-olefins can be derived from the ethylene chain growth process. This process yields even numbered straight chain 1-olefins from a controlled Ziegler polymerization.

Other methods for preparing the mono-olefins of this invention include chlorination-dehydrochlorination of paraffin and catalytic dehydrogenation of paraffins.

The above procedures for the preparation of mono-olefins are well known to those of ordinary skill in the art and are described in detail under the heading "Olefins" in the *Encyclopedia of Chemical Technology*, Second Edition, Kirk and Othmer, Supplement, Pages 632–657, Interscience Publishers, Div. of John Wiley and Son, 1971, which is hereby incorporated by reference for its relevant disclosures pertaining to methods for preparing mono-olefins.

Suitable vinyl aromatic monomers which can be polymerized with the alpha, beta-unsaturated dicarboxylic acids or derivatives thereof include styrene and the substituted styrenes although other vinyl aromatic monomers can also be used. The nature of the vinyl aromatic monomer is normally not a critical or essential aspect of this invention as these compounds serve primarily as a connective moiety for the alpha, beta-unsaturated compounds in forming the interpolymers. The substituted styrenes include the halo-substituted styrenes (e.g., alpha-halostyrenes), and the hydrocarbyl-substituted styrenes wherein the hydrocarbyl group has from 1 to about 12 carbon atoms. Exemplary of the hydrocarbyl-substituted styrenes are the alpha-methylstyrene, para-tert-butylstyrene, alpha-ethylstyrene, and para-lower alkoxy styrene. Mixtures of two or more vinyl aromatic monomers can be used.

Suitable alpha, beta-unsaturated carboxylic acids, anhydrides or lower alkyl esters thereof useful in the preparation of the interpolymers include mono-carboxylic acids (e.g., acrylic acid, methacrylic acid, etc.) or lower alkyl esters thereof, as well as dicarboxylic acids, anhydrides or lower alkyl esters thereof wherein a carbon-to-carbon double bond is in an alpha, beta-position to at least one of the carboxy functions (e.g., itaconic acid, anhydride or lower esters thereof) and preferably, in an alpha, beta-position to both of the carboxy functions of the alpha, beta-dicarboxylic acid, anhydride or the lower alkyl ester thereof (e.g., maleic acid, anhydride or lower alkyl esters thereof). Normally, the carboxy functions of these compounds will be separated by up to about 4 carbon atoms, preferably about 2 carbon atoms.

A class of preferred alpha, beta-unsaturated dicarboxylic acid, anhydrides or the lower alkyl esters thereof, includes those compounds corresponding to the formulae:

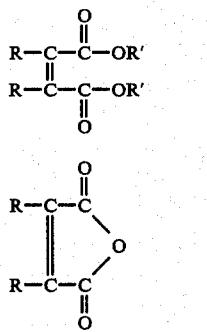

(including the geometric isomers thereof, i.e., cis and trans) wherein each R is independently hydrogen; halogen (e.g., chloro, bromo, or iodo); hydrocarbyl or halogen-substituted hydrocarbyl of up to about 8 carbon atoms, preferably alkyl, alkaryl or aryl; (preferably, at least one R is hydrogen); and each R' is independently hydrogen or lower alkyl of up to about 7 carbon atoms (e.g., methyl, ethyl, butyl or heptyl). These alpha, beta-unsaturated dicarboxylic acids, anhydrides or alkyl esters thereof contain a total carbon content of up to about 25 carbon atoms, normally up to about 15 carbon atoms. Examples include maleic anhydride; benzyl maleic anhydride; chloro maleic anhydride; heptyl maleate; itaconic anhydride; ethyl fumarate; fumaric acid; mesaconic acid; ethyl isopropyl maleate; isopropyl fumarate; hexyl methyl maleate; phenyl maleic anhydride and the like. These and other alpha, beta-unsaturated dicarboxylic compounds are well known in the art. Maleic anhydride, maleic acid and fumaric acid and the lower alkyl esters thereof are preferred. Interpolymers derived from mixtures of two or more of any of these can also be used.

Particularly preferred esters of this invention are those of interpolymers made by reacting maleic acid, or anhydride or the lower esters thereof with styrene. Of these particularly preferred interpolymers those which are made of maleic anhydride and styrene and have a RSV in the range of about 0.2 to about 0.9, preferably about 0.35 to about 0.7, are especially useful. Of these latter preferred interpolymers, copolymers of maleic anhydride and styrene having a molar ratio of the maleic anhydride to styrene of about 1:1 are especially preferred. They can be prepared according to methods known in the art, as for example, free radical initiated (e.g., by benzoyl peroxide) solution polymerization. Examples of such suitable interpolymerization techniques are described in U.S. Pat. Nos. 2,938,016; 2,980,653; 3,085,994; 3,342,787; 3,418,292; 3,451,979; 3,536,461; 3,558,570; 3,702,300; 3,723,375; 3,933,762; and 4,284,414. These patents are incorporated herein by reference for their teaching of the preparation of suitable maleic anhydride and styrene containing interpolymers. Other preparative techniques are known in the art.

The molecular weight (i.e., RSV) of such interpolymers can be adjusted to the range required in this invention, if necessary, according to conventional techniques, e.g., control of the reaction conditions.

The following examples serve to illustrate the preparation of the interpolymers used in this invention and are not intended as limiting thereof. Unless otherwise indicated, in the following examples as well as throughout the specification and in the appended claims, all parts and percentages are by weight and all temperatures are in degrees centigrade.

EXAMPLE 1

A styrene-maleic interpolymer is obtained by reacting 16.3 parts styrene and 12.9 parts of maleic anhydride in 272.7 parts of a benzene-toluene solvent mixture (weight ratio of benzene:toluene being 66.5:33.5) at 86° C. in a nitrogen atmosphere for 8 hours with 0.42 part of a benzoyl peroxide catalyst. The resulting product is a thick slurry of the interpolymer in the solvent mixture. To the slurry there is added 141 parts of mineral oil while the solvent mixture is being distilled off at 150° C. and then at 150° C. under a vacuum of 200 torr. A sample of the interpolymer isolated from the oil has a RSV of 0.69.

EXAMPLE 2

An interpolymer is prepared by reacting (while maintaining the temperature between 99°–105° C.) 536 parts of styrene and 505 parts of maleic anhydride in 7585 parts of toluene in the presence of a catalyst solution prepared by dissolving 1.5 parts of benzoyl peroxide in 50 parts of toluene. The toluene is removed by vacuum stripping as 2228 parts of mineral oil are added. The oil solution obtained in this manner contains 55.4% oil. The resulting interpolymer (free of oil) has a RSV of 0.42.

EXAMPLE 3

The procedure of Example 1 is followed except that the interpolymer is prepared by reacting (while maintaining the temperature between 65°–106° C.) 416 parts of styrene and 392 parts of maleic anhydride in a mixture of 2153 parts of benzene and 5025 parts of toluene in the presence of 1.2 parts of benzoyl peroxide. The resulting interpolymer (free of oil) has a RSV of 0.45.

EXAMPLE 4

The procedure of Example 1 is followed except that the interpolymer is obtained by reacting (while maintaining the temperature between 78°–92° C.), 416 parts of styrene and 392 parts of maleic anhydride in a mixture of 6101 parts of benzene and 2310 parts of toluene in the presence of 1.2 parts of benzoyl peroxide. The resulting interpolymer (free of oil) has a RSV of 0.91.

EXAMPLE 5

The procedure of Example 1 is followed except that the interpolymer is prepared by the following procedure. 392 parts of maleic anhydride are dissolved in 6870 parts of benzene. To this mixture at 76° C. is added first 416 parts of styrene, then 1.2 parts of benzoyl peroxide. The mixture is maintained at 80°–82° C. for 5 hours. The resulting interpolymer (free of oil) has a RSV of 1.24.

EXAMPLE 6

The procedure of Example 5 is followed except that 1340 parts of acetone is used in place of benzene as solvent and that 0.3 part of azobis-isobutyronitrile is used in place of benzoyl peroxide as catalyst.

EXAMPLE 7

The procedure of Example 1 is followed except that the interpolymer is prepared as follows. To a solution of 69 parts of maleic anhydride in 805 parts of benzene at 50° C. there is added 73 parts of styrene. The resulting mixture is heated to 83° C. and 0.19 part of benzoyl peroxide is added. The mixture is then maintained at 80°–85° C. The resulting interpolymer (free of oil) has a RSV of 1.64.

EXAMPLE 8

The procedure of Example 1 is followed except that the interpolymer is prepared by the following procedure. 176.4 parts of maleic anhydride are dissolved in 2641 parts of xylene. To this mixture at 105° C. is added first 188 parts of styrene. Then 1.83 parts benzoyl peroxide dissolved in 32 parts xylene are added over a 1.5 hour period. The mixture is maintained at 104°–106° C. for 4 hours. The resulting interpolymer (free of oil) has a RSV of 0.25.

In reference to the size of the ester groups, it is pointed out that a carboxylic ester group is represented by the formula

—C(O)(OR)

and that the number of carbon atoms in a carboxylic ester group is thus the combined total of the carbon atom of the carbonyl group and the carbon atoms of the ester group, i.e., the (OR) group.

I(B) ESTERIFICATION

The esterification of the interpolymers of this invention can be accomplished either by sequential or concurrent reaction with the alcohols of at least 8 aliphatic carbon atoms to form the carboxylic ester group (A), the alkoxylates of the formula discussed below to form the carboxylic ester groups (B), and, optionally, the alcohols of no more than 7 aliphatic carbon atoms to form the carboxylic ester groups (C). Esterification to form the group (B) must be carried out only if the ester group (A) contains less than 28 carbon atoms but may be carried out to obtain an ester group (B) even if the ester group (A) contain 28 carbons or more. In either case esterification with (C) is optional.

Suitable alcohols of at least 8 aliphatic carbon atoms for providing the carboxylic ester group (A) are the monohydric alcohols of at least 8 aliphatic carbon atoms. If esterification is to be carried out only with an ester group (A), the alcohol will be one containing 28–100 carbon atoms and will preferably be a monohydric alcohol containing 28–48 carbon atoms. These longer chain esterifying groups can be used by themselves or in combination with the esterifying group (B) and (C). When the esterified interpolymer of the invention is to be used in connection with a less waxy crude, the (A) group will generally be derived from a monohydric alcohol containing 8–30 carbons, preferably 12–30 carbons, and will be used with an esterifying group (B). For use with less waxy crudes, a particularly advantageous embodiment includes the shorter chain ester group (A) with the ester group (B). More specifically, at least about 50 mole percent, preferably at least about 70 mole percent of the alcohols used for providing the carboxylic ester group (A) have from about 16 to about 30, preferably from about 18 to about 24, more preferably from about 18 to about 22 aliphatic carbon atoms. The 1-alkanols are especially preferred. Examplary alcohols that are useful include the octanols, nonanols, decanols, undecanols, dodecanols, tetradecanols, hexadecanols, octadecanols, eicosanols, docosanols, tricosanols, tetracosanols, heptacosanols, triacontanols, and mixtures thereof. Of course, commercially available alcohols and alcohol mixtures are contemplated herein and these commercial alcohols may comprise minor amounts of other alcohols which, although not specified herein, do not detract from providing the desired esters. Among the commercially available alcohols and alcohol mixtures that are useful are the alcohols available from Fallek Chemical Company under the names Behenyl (identified as a mixture of 15% $C_{18}$, 15% $C_{20}$ and 70% $C_{22}$ fatty alcohols) and Stenol 1822 (identified as a mixture of 40–45% $C_{18}$, 8–20% $C_{20}$, 40–45% $C_{22}$ and 1% $C_{24}$ fatty alcohols); Shell Chemical Co. under the name Neodol 45 (identified as a mixture of $C_{14}$ and $C_{15}$ linear primary alcohols); Continental Oil Co. under the names Alfol 1618 (identified as a mixture of $C_{16}$ and $C_{18}$ primary straight chain alcohols) and Alfol 1412 (identified as a mixture of $C_{12}$ and $C_{14}$ alcohols). Additional alcohols that can be used include the Alfol 20+ alcohols and the Alfol 22+ alcohols marketed by Continental Oil Corporation. The Alfol 20+ alcohols are identified as being mixtures of $C_{18-28}$ primary alcohols as determined by GLC (gas-liquid chromatography). The Alfol 22+ alcohols are identified as $C_{18-28}$ primary alcohols having mostly, on an alcohol basis, $C_{22}$ alcohols as determined by GLC. These Alfol alcohols can contain a fairly large percent (e.g., up to about 40% by weight) of paraffinic compounds. These paraffinic compounds can be removed before esterification although such removal is not necessary. Other commercially available alcohol mixtures that are useful include mixtures containing alcohols with 18 to 22 carbon atoms such as those available from Ashland Oil ("Adol 60") and Henkel.

When the esterified interpolymer is used with a very waxy crude oil, the ester group (A) is an aliphatic group containing 28 to 100 carbon atoms, preferably 28 to 48 carbon atoms. Examples of alcohols preferably used in obtaining such long chain ester groups are various long chain saturated monohydric alcohols containing 28 to 48 carbons. Alcohols sold by Petrolite as Polywax OH Alcohols have been found to be useful; specifically Polywax OH 425 (29 carbons), Polywax OH 550 (38 carbons), Polywax OH 700 (48 carbons).

Suitable alkoxylates for forming the carboxylic ester group (B) are represented by the formula

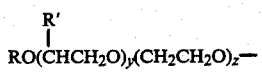

wherein R is a hydrocarbyl group of from 1 to about 50 carbon atoms. When the interpolymer ester of the invention is used with a less waxy crude, the ester group (A) contains 8-30 carbons and the group (B) is defined by the above formula wherein R is preferably from about 4 to about 30 carbon atoms, more preferably from about 12 to about 24 carbon atoms, and advantageously from about 12 to about 18 carbon atoms; R' is a hydrocarbyl group of from 1 to about 50 carbon atoms, preferably from about 4 to about 30 carbon atoms; y is a number in the range of zero to about 50, preferably from 1 to about 30, more preferably from 1 to about 8; z is a number in the range of zero to about 50, preferably from 1 to about 30, more preferably from 1 to about 8. R is preferably aliphatic and more preferably linear aliphatic. R' is preferably aliphatic, more preferably linear aliphatic, and advantageously it is methyl. In a preferred embodiment, R' is methyl, and y and z are each at least 1. In another preferred embodiment, y is zero; z is a number in the range of from 1 to about 25, preferably from 1 to about 10, more preferably from 1 to about 5; and R has from about 4 to about 30 carbon atoms, preferably from about 12 to about 18 carbon atoms. In still another preferred embodiment, y is a number in the range of from 1 to about 30, preferably from 1 to about 8; z is a number in the range of from 1 to about 30, preferably from 1 to about 8; R' is methyl; and R has from about 4 to about 30 carbon atoms. The ester groups (B) as defined above can be used in combination with any ester group (A), i.e., short chain (A) groups of 8-30 carbons or long chain (A) groups of 28-100 carbons. The (B) groups are necessarily copresent with the shorter chain (A) groups, but not necessarily copresent with the longer chain (A) groups. Commercially available alkoxy alcohols that are useful include the Alfonics which are products of Conoco identified as a series of ethoxylates of the formula

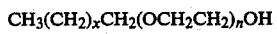

wherein x is a number in the range of about 4 to about 16 and n is a number in the range of about 3 to about 11. Other commercially available ethoxylates that can be used include those available from Shell Chemical Co. under the names Neodol 23-6.5 (identified as a $C_{12-13}$ linear primary alcohol ethoxylate), and Neodol 25-3 (identified as a $C_{12-15}$ linear primary alcohol ethoxylate).

Suitable alcohols for forming the optional carboxylic ester group (C) include the $C_1$ to $C_7$ aliphatic alcohols, preferably the 1-alkanols. Included in this group are methanol, ethanol, the propanols, butanols, pentanols, hexanols and heptanols. Regardless of the chain length of the (A) ester group or the presence of the (B) group, the (C) group's presence is optional.

The esterification is conducted until at least about 50%, preferably at least about 70%, more preferably at least about 90%, and advantageously at least about 95% of the carboxy functions of the interpolymers are esterified to form the pendant ester groups (A), (B) and with (B) being optional depending on the length of the carbon chain of (A) and (C) being optional in any case. Preferably substantially all of the carboxy functions are esterified. When the group (A) contains less than 28 carbons, i.e., 8-28 carbons, the molar ratio of pendant groups (A) to pendant groups (B) is generally in the range of about 100:1 to about 1:2, preferably from about 20:1 to about 1:1, more preferably from about 10:1 to about 3:1. The molar ratio of (A):(B):(C) is about (30-99):(1-70):(0-20). As indicated above, pendant group (C) is optional. When pendant group (C) is present it is preferably present in only minute quantities. Preferably pendant group (C) is not present.

Esterification of the interpolymers can be accomplished by heating any of the interpolymers (having the requisite RSV) and the desired alcohol(s) and alkoxylate(s) under conditions typical for effecting esterification. Such conditions include, for example, a temperature of at least about 80° C., but more preferably from about 150° C. to about 350° C., provided that the temperature is maintained at a level below the decomposition of the reaction mixture or products thereof. Water or lower alcohol is normally removed as the esterification proceeds. These conditions may optionally include the use of a substantially inert, normally liquid, organic solvent or diluent such as mineral oil, toluene, benzene, xylene or the like and an esterification catalyst such as toluene sulfonic acid, sulfuric acid, aluminum chloride, boron trifluoride-triethylamine, methane sulfonic acid, hydrochloric acid, ammonium sulfate, phosphoric acid, sodium methoxide or the like. These conditions and variations thereof are well known in the art.

It is preferable that substantially all the carboxy functions of the interpolymers be reacted with the alcohols and alkoxylates, but as indicated above useful products can be obtained when at least about 50%, preferably at least about 70%, more preferably at least about 90% and advantageously at least about 95% of the carboxy functions have been so reacted. Generally, therefore, an excess of alcohols and alkoxylates over the stoichiometric requirement for complete esterification of the carboxy functions is preferably used. As a practical matter, however, complete esterification may be too difficult or time consuming to achieve. Moreover, excess (over stoichiometric requirement) of alcohols and alkoxylates or unreacted alcohols and alkoxylates need not be removed as such alcohols and alkoxylates can serve, for example, as diluent or solvent in the use of the esters. Similarly, optional reaction media, e.g., toluene, need not be removed as they can similarly serve as diluent or solvent in the use of the esters.

I(C) EXAMPLES OF ESTERIFICATION OF THE INTERPOLYMER

The following examples serve to illustrate the preparation of the esters of this invention, and are not intended as limiting thereof.

EXAMPLE 9

A mixture of 4554 parts of the interpolymer oil solution of Example 2, 1525 parts of a behenyl alcohol mixture provided by Henkel (a mixture of 17.4 mole percent of $C_{18}$ primary alcohol, 15.6 mole percent of $C_{20}$ primary alcohol, and 67 mole percent of $C_{22}$ primary alcohol), 416 parts of Alfonic 1412-40, a product of Conoco identified as an ethoxylate of the formula $$CH_3(CH_2)_{10-12}CH_2(OCH_2CH_2)_3OH$$

73 parts of para-toluene sulfonic acid and 18.6 parts of an isomeric mixture of butylphenol is heated to a temperature of 105° C. over a period of 1.75 hours with stirring and nitrogen blowing at one standard cubic foot per hour. The reaction mixture begins to reflux steadily. The temperature is raised to 150° C. over a period of 3.5 hours. 3463 parts of azeotrope are collected. The nitrogen blowing rate is reduced to 0.3 standard cubic foot per hour. The reaction mixture is maintained at 150° C. for 18 hours. 350 parts of xylene are added to the reaction mixture with stirring, and the reaction mixture is maintained at 150° C. for two hours. 303 parts of xylene are added to the reaction mixture, and distillation of remaining toluene in the reaction mixture is commenced. After 2.25 hours of continued heating at 150° C., 355 parts xylene are added. After 0.75 hours of continued heating at about 148° C., 423 parts of xylene are added. After 0.25 hours of heating at 148° C., 360 parts of xylene are added. After an additional 0.5 hour of maintaining the reaction mixture at 148° C., heating is discontinued. At this point, the total amount of azeotrope collected is 4304 parts. The reaction mixture is cooled to 95° C. 3847 parts of the reaction mixture are diluted with 1219 parts of xylene to provide the desired product.

EXAMPLE 10

A mixture of 613 parts of the interpolymer oil solution of Example 2, 201 parts of the behenyl alcohol mixture identified in Example 9, 16 parts of an isomeric mixture of $C_{13}$ alkanols, 27.2 parts of Alfonic 1412-40, 11 parts of para-toluene sulfonic acid, and 2 parts of an isomeric mixture of butyl phenol is stirred and heated to reflux under nitrogen blowing at one stardard cubic foot per hour. 358 parts of azeotrope are removed, the remaining mass being 512 parts. The reaction mixture temperature is increased to 152° C. The rate of nitrogen blowing is reduced to about 0.1 standard cubic foot per hour. The reaction mixture is maintained under reflux conditions for about 26 hours. The reaction mixture is then cooled to 100° C. and 143 parts of xylene are added to the reaction mixture to provide the desired product.

EXAMPLE 11

A mixture of 721 parts of the interpolymer oil solution of Example 2, 184 parts of the behenyl alcohol mixture identified in Example 9, 44 parts of Neodol 45 (a product of Shell Chemical Co. identified as a $C_{14-15}$ linear primary alcohol mixture), 46 parts of Alfonic 1412-40, 12.7 parts of para-toluene sulfonic acid, and 2 parts of an isomeric mixture of butyl phenol is stirred and heated to reflux under nitrogen blowing at one standard cubic foot per hour. 394 parts of azeotrope are removed, the remaining mass being 616 parts. The reaction mixture temperature is increased to 150° C. The rate of nitrogen blowing is reduced to about 0.1 standard cubic foot per hour. The reaction mixture is maintained under reflux conditions for about 24 hours. 93.1% of the carboxy functions of the interpolymer are esterified. 1.0 part of para-toluene sulfonic acid, 8.1 parts of the above-identified behenyl alcohol mixture, 2.1 parts of Alfonic 1412-40 and 2.0 parts of Neodol 45 are added to the reaction mixture. The reaction mixture is maintained under reflux conditions for 5 hours. The reaction mixture is then cooled to 80° C. and 137 parts of xylene are added to the reaction mixture to provide the desired product.

EXAMPLE 12

A mixture of 715 parts of the interpolymer oil solution of Example 8, 236 parts of the behenyl alcohol mixture identified in Example 9, 64.5 parts of Alfonic 1412-40, 12.2 parts of para-toluene sulfonic acid, and 3 parts of an isomeric mixture of butyl phenol is stirred and heated to reflux under nitrogen blowing at one standard cubic foot per hour. 412 parts of azeotrope are removed, the remaining mass being 619 parts. The reaction mixture temperature is increased to 151° C. The rate of nitrogen blowing is reduced to about 0.1 standard cubic foot per hour. The reaction mixture is maintained under reflux conditions for about 25.5 hours. 95.0% of the carboxy functions of the interpolymer are esterified. The reaction mixture is then cooled to 60° C. and 179 parts of xylene are added to the reaction mixture to provide the desired product.

EXAMPLE 13

A mixture of 731 parts of the interpolymer oil solution of Example 2, 187 parts of the behenyl alcohol mixture identified in Example 9, 33.3 parts of Neodol 45, 64.5 parts of Alfonic 1412-40, 12 parts of para-toluene sulfonic acid, and 3 parts of an isomeric mixture of butyl phenol is stirred and heated to reflux under nitrogen blowing at one standard cubic foot per hour. 420 parts of azeotrope are removed. The reaction mixture temperature is increased to 149° C. The rate of nitrogen blowing is reduced to about 0.2 standard cubic foot per hour. The reaction mixture is maintained under reflux conditions for about 24 hours. The reaction mixture is then cooled to 90° C. and 156 parts of xylene are added to the reaction mixture to provide the desired product. 94.2% of the carboxy functions of the interpolymer are esterified.

EXAMPLE 14

A mixture of 731 parts of the interpolymer oil solution of Example 2, 232 parts of the behenyl alcohol mixture identified in Example 9, 61.2 parts of Tergitol 15-S-3 (a product of Union Carbide identified as an ethoxylate with three ethoxy groups and $C_{11-15}$ linear alcohol), and 13.4 parts of para-toluene sulfonic acid is stirred and heated with nitrogen blowing at one standard cubic foot per hour. At 128° C. the reaction mixture clarifies and becomes gelatinous. Heating at 140° C. is continued until the desired partially esterified gelatinous product is obtained.

EXAMPLE 15

A mixture of 733 parts of the interpolymer oil solution of Example 2, 187 parts of the behenyl alcohol mixture identified in Example 9, 20 parts of 2-ethyl hexanol, 64 parts of Alfonic 1412-40, 12.9 parts of para-toluene sulfonic acid, and 2 parts of an isomeric mixture of butyl phenol is stirred and heated to reflux under nitrogen blowing at one standard cubic foot per hour. 404 parts of azeotrope are removed, the remaining mass being 615 parts. The reaction mixture temperature is increased to 150° C. The rate of nitrogen blowing is reduced to about 0.1 standard cubic foot per hour. The reaction mixture is maintained under reflux conditions for 23.5 hours. 8.5 parts of the above-identified behenyl alcohol mixture, 2.9 parts of Alfonic 1412-40, 0.9 parts of 2-ethyl hexanol and 1 part of para-toluene sulfonic acid are added to the reaction mixture. The reaction mixture is maintained under reflux conditions for 4 hours. The reaction mixture is then cooled to 80° C. and 145 parts of xylene are added to the reaction mixture to provide the desired product.

EXAMPLE 16

A mixture of 720.4 parts of the interpolymer oil solution of Example 2, 190 parts of the behenyl alcohol mixture identified in Example 9, 55 parts of 1-octadecanol, 46.7 parts of Alfonic 1412-40, 13 parts of para-toluene sulfonic acid, and 2 parts of an isomeric mixture of butyl phenol is stirred and heated to reflux under nitrogen blowing at one standard cubic foot per hour. 447 parts of azeotrope are removed, the remaining mass being 580 parts. The reaction mixture temperature is increased to 154° C. The rate of nitrogen blowing is reduced to about 0.1 standard cubic foot per hour. The reaction mixture is maintained under reflux conditions for 26.5 hours. The reaction mixture is then cooled to 80° C. and 202 parts of xylene are added to the reaction mixture to provide the desired product. 95.4% of the carboxy functions of the interpolymer are esterified.

EXAMPLE 17

A mixture of 715 parts of the interpolymer oil solution of Example 2, 209 parts of the behenyl alcohol mixture identified in Example 9, 28.6 parts of an isomeric mixture of $C_{13}$ alkanols, 40.5 parts of Alfonic 1412-40, 13.2 parts of para-toluene sulfonic acid, and 2 parts of an isomeric mixture of butyl phenol is stirred and heated to reflux under nitrogen blowing at one standard cubic foot per hour. 402 parts of azeotrope are removed, the remaining mass being 606 parts. The reaction mixture temperature is increased to 151° C. The rate of nitrogen blowing is reduced to about 0.1 standard cubic foot per hour. The reaction mixture is maintained under reflux conditions for 25 hours. The reaction mixture is then cooled to 70° C. and 154 parts of xylene are added to the reaction mixture to provide the desired product. 95.2% of the carboxy functions of the interpolymer are esterified.

EXAMPLE 18

A mixture of 721 parts of the interpolymer oil solution of Example 2, 220 parts of Stenol 1822, 63.5 parts of Alfonic 1412-40, 163 parts of para-toluene sulfonic acid, and 2.2 parts of an isomeric mixture of butyl phenol is stirred and heated to reflux under nitrogen blowing at one standard cubic foot per hour. 407 parts of azeotrope are removed, the remaining mass being 611 parts. The reaction mixture temperature is increased to 150° C. The rate of nitrogen blowing is reduced to about 0.1 standard cubic foot per hour. The reaction mixture is maintained under reflux conditions for 26 hours. 10 parts of Stenol 1822, 2.8 parts of Alfonic 1412-40 are added to the reaction mixture. The reaction mixture is maintained at 150° C. for 2 hours. The reaction mixture is then cooled to 90° C. and 140 parts of xylene are added to the reaction mixture to provide the desired product. 94.1% of the carboxy functions of the interpolymer are esterified.

EXAMPLE 19

A mixture of 770 parts of the interpolymer oil solution of Example 2, 221 parts of the behenyl alcohol mixture identified in Example 9, 103.5 parts of Alfonic 1412-40, 12.8 parts of para-toluene sulfonic acid, and 3 parts of an isomeric mixture of butyl phenol is stirred and heated to reflux under nitrogen blowing at one stardard cubic foot per hour. 440 parts of azeotrope are removed, the remaining mass being 671 parts. The reaction mixture temperature is increased to 150° C. The rate of nitrogen blowing is reduced to about 0.2 standard cubic foot per hour. The reaction mixture is maintained under reflux conditions for 24 hours. 10 parts of the above-identified behenyl alcohol mixture and 4.6 parts of Alfonic 1412-40 are added to the reaction mixture. The reaction mixture is maintained under reflux conditions overnight. The reaction mixture is then cooled to 90° C. and 206 parts of xylene are added to 652 parts of the reaction mixture to provide the desired product.

EXAMPLE 20

A mixture of 710 parts of the interpolymer oil solution of Example 8, 187 parts of the behenyl alcohol mixture identified in Example 9, 117 parts of Alfonic 1412-40, 12.1 parts of para-toluene sulfonic acid, and 3 parts of an isomeric mixture of butyl phenol is stirred and heated to reflux under nitrogen blowing at one standard cubic foot per hour. 434 parts of azeotrope are removed, the remaining mass being 596 parts. The reaction mixture temperature is increased to 152° C. The rate of nitrogen blowing is reduced to about 0.1 standard cubic foot per hour. The reaction mixture is maintained under reflux conditions overnight. The reaction mixture is then cooled to 100° C. and 143 parts of xylene are added to 572 parts of the reaction mixture to provide the desired product.

EXAMPLE 21

A mixture of 726 parts of the interpolymer oil solution of Example 2, 186 parts of the behenyl alcohol mixture identified in Example 9, 43 parts of Alfol 1618, 64 parts of Alfonic 1412-40, 12.8 parts of para-toluene, sulfonic acid, and 3 parts of an isomeric mixture of butyl phenol is stirred and heated to reflux under nitrogen blowing at one standard cubic foot per hour. 367 parts of azeotrope are removed. The reaction mixture temperature is increased to 150° C. The rate of nitrogen blowing is reduced to 0.1-0.2 standard cubic foot per hour. The reaction mixture is maintained under reflux conditions for 24 hours. 18.6 parts of the above-identified behenyl alcohol mixture, 5 parts of Alfol 1618, 0.5 parts of Alfonic 1412-40, and 3.3 parts of para-toluene sulfonic acid are added to the reaction mixture. The reaction mixture is maintained under reflux conditions for 16.5 hours. The reaction mixture is then cooled to 100° C. and 166 parts of xylene are added to the reaction mixture to provide the desired product.

EXAMPLE 22

A mixture of 704 parts of the interpolymer oil solution of Example 2, 182 parts of the behenyl alcohol mixture identified in Example 9, 42 parts of oleyl alcohol, 62 parts of Alfonic 1412-40, 15 parts of para-toluene sulfonic acid, and 3 parts of an isomeric mixture of butyl phenol is stirred and heated to reflux under nitrogen blowing at one standard cubic foot per hour. 400 parts of azeotrope are removed. The reaction mixture temperature is increased to 150° C. The rate of nitrogen blowing is reduced to about 0.2 standard cubic foot per hour. The reaction mixture is maintained under reflux conditions for 17.3 hours. The reaction mixture is then cooled and 164 parts of xylene are added to the reaction mixture to provide the desired product. 92.8% of the carboxy functions of the interpolymer are esterified.

EXAMPLE 23

A mixture of 696 parts of the interpolymer oil solution of Example 8, 230 parts of the behenyl alcohol mixture identified in Example 9, 97 parts of Alfonic 1412-60, a product of Conoco identified as an ethoxylate having the formula $$CH_3(CH_2)_{10-12}CH_2(OCH_2CH_2)_7OH$$

12.6 parts of para-toluene sulfonic acid, and 3 parts of an isomeric mixture of butyl phenol is stirred and heated to reflux under nitrogen blowing at one standard cubic foot per hour. 352 parts of azeotrope are removed, the remaining mass being 687 parts. The reaction mixture temperature is increased to 152° C. The rate of nitrogen blowing is reduced to about 0.1 standard cubic foot per hour. The reaction mixture is maintained under reflux conditions for 23 hours. 20.7 parts of the above-identified behenyl alcohol mixture, 7.0 parts of Alfonic 1412-60 and 1.2 parts of para-toluene sulfonic acid are added to the reaction mixture. The reaction mixture is maintained under reflux conditions for 4.5 hours. 2.0 parts of para-toluene sulfonic acid are added to the reaction mixture. The reaction mixture is maintained under reflux conditions for about 18.5 hours. The reaction mixture is then cooled to 80° C. and 199 parts of xylene are added to the reaction mixture to provide the desired product.

EXAMPLE 24

A mixture of 719 parts of the interpolymer oil solution of Example 2, 232 parts of the behenyl alcohol mixture identified in Example 9, 98 parts of Alfonic 1412-60, 12.7 parts of para-toluene sulfonic acid, and 3 parts of an isomeric mixture of butyl phenol is stirred and heated to reflux under nitrogen blowing at one stardard cubic foot per hour. 373 parts of azeotrope are removed, the remaining mass being 692 parts. The reaction mixture temperature is increased to 150° C. The rate of nitrogen blowing is reduced to about 0.2 standard cubic foot per hour. The reaction mixture is maintained under reflux conditions for 22 hours. 20.8 parts of the above-identified behenyl alcohol mixture, 7.3 parts of Alfonic 1412-60 and 2.4 parts of para-toluene sulfonic acid are added to the reaction mixture. The reaction mixture is maintained under reflux conditions for 4 hours. 2.4 parts of para-toluene sulfonic acid are added to the reaction mixture. The reaction mixture is maintained under reflux conditions for 23 hours. The reaction mixture is then cooled to 90° C. and 216 parts of xylene are added to the reaction mixture to provide the desired product.

EXAMPLE 25

A mixture of 698 parts of the interpolymer oil solution of Example 2, 178 parts of the behenyl alcohol mixture identified in Example 9, 29 parts of an isomeric mixture of $C_{13}$ alkanols, 61 parts of Alfonic 1412-40, 12.2 parts of para-toluene sulfonic acid, and 2 parts of an isomeric mixture of butyl phenol is stirred and heated to reflux under nitrogen blowing at one stardard cubic foot per hour. 373 parts of azeotrope are removed, the remaining mass being 607 parts. The reaction mixture temperature is increased to 148° C. The rate of nitrogen blowing is reduced to about 0.1 standard cubic foot per hour. The reaction mixture is maintained under reflux conditions for 25 hours. 8 parts of the above-identified behenyl alcohol mixture, 2.8 parts of Alfonic 1412-40, 1.3 parts of the above-identified mixture of $C_{13}$ alkanols and 1.0 part of para-toluene sulfonic acid are added to the reaction mixture. The reaction mixture is maintained under reflux conditions for 3.75 hours. The reaction mixture is then cooled to 100° C. and 131 parts of xylene are added to the reaction mixture to provide the desired product.

EXAMPLE 26

A mixture of 750 parts of the interpolymer oil solution of Example 2, 240 parts of the behenyl alcohol mixture identified in Example 9, 92 parts of Neodol 23-6.5, a product of Shell Chemical identified as an ethoxylate having the formula $$CH_3(CH_2)_{11-12}O(CH_2CH_2O)_{6.5}H$$

13.4 parts of para-toluene sulfonic acid, and 2 parts of an isomeric mixture of butyl phenol is stirred and heated to reflux under nitrogen blowing at one standard cubic foot per hour. 359 parts of azeotrope are removed, the remaining mass being 738 parts. The reaction mixture temperature is increased to 150° C. The rate of nitrogen blowing is reduced to about 0.1 standard cubic foot per hour. The reaction mixture is maintained under reflux conditions for 22.5 hours. 22 parts of the above-identified behenyl alcohol mixture, 10.5 parts of Neodol 23-6.5 and 1.0 part of para-toluene sulfonic acid are added to the reaction mixture. The reaction mixture is maintained under reflux conditions for 10 hours. 12.6 parts of the above-identified behenyl alcohol mixture, 4.9 parts of Neodol 23-6.5 and 2.0 parts of para-toluene sulfonic acid are added to the reaction mixture. The reaction mixture is maintained under reflux conditions for 19 hours. 2.0 parts of para-toluene sulfonic acid are added to the reaction mixture. The reaction mixture is maintained under reflux conditions for 5 hours. 93.4% of the carboxy functions of the interpolymer are esterified. The reaction mixture is then cooled to 70° C. and 202 parts of xylene are added to 708 parts of the reaction mixture to provide the desired product.

Esterified interpolymers of the present invention which include ester groups (A) of long chain length could be prepared in substantially the same manner as indicated above by substituting some or all of the alcohols and/or alkoxylates used above with an alcohol containing 28 to 100 carbons, preferably 28–48 carbon monohydric alcohols.

CRUDE OIL COMPOSITIONS

The esters of the invention are suitable for modifying the flow characteristics of liquid hydrocarbon compositions in the form of crude oils. "Crude oils" as used herein, and in the appended claims, refer to all of the commonly known mineral oils obtained from wells. The benefits obtained from the incorporation of the esters described above are particularly evident when such esters are incorporated into very high wax-containing crude oils having high boiling points and pour points above about 25° C. North African crude oils designated as Zelten, Indian crudes and Indonesian crudes are examples of waxy crude oils which can be treated with the esters of the invention to improve the flow properties.

The amount of ester that will be used to improve the flow properties of the crude oils generally will be that amount which is effective to provide the desired changes in the flow properties of the crude oil. This amount will depend on certain factors including the concentration and nature of the wax in the crude, and the lowest temperature that will be attained by the crude oil during the time that flowability is important. This amount can be readily determined by adding increasing amounts of the ester to samples of crude oil, adjusting the temperature to the lowest temperature to be attained by the crude, and noting the concentration at which wax crystallization no longer occurs. This amount generally will range from at least about 0.001% by weight to as high as about 1% or 2% by weight. Generally, however, a range of from about 0.003% to about 0.01% or even 0.2% or 0.3% by weight is sufficient to impart a desired level of flow improvement and pour point depressancy to the crude oils. Higher levels, e.g., 1% or higher can be used but these levels are generally uneconomical.

The esters of the invention can be fluidized in solvent or diluent carriers. The combination of one or more fluidized esters and a solvent or diluent carrier is referred to herein as a concentrate composition. The concentrate compositions of this invention are especially advantageous for storing, transport and addition of the ester to crude oils. The ester can contain from about 0.1% to about 90% by weight of the total concentrate composition, preferably from about 10% to about 70% by weight, of the total weight of the concentrate composition.

The terminology "fluidized" as used herein is intended to refer to solutions, suspensions or emulsions of the ester in solvent or diluent carriers. While some settling or separation over a period of time of the fluidized ester normally can be tolerated in the concentrate compositions contemplated herein, it is usually preferred that most of the ester either be dissolved, or uniformly dispersed in the form of a stable suspension, in the solvent or diluent carrier. The fluidized nature of the ester in the solvent or solvent carrier will be readily apparent to those in the art.

The balance of the concentrate composition, i.e., the solvent or diluent carrier, is normally comprised of one or more normally liquid solvents or diluents, referred to herein as solvent or diluent carriers. These solvents or diluents are substantially inert, (i.e., do not react with the mixed alkyl ester or the oil to which it is to be added, to any appreciable extent) normally liquid, organic materials. The solvent or diluents can be selected from a wide range of materials and may include unreacted monohydric alcohols and reaction media, as above described, low boiling solvents, mineral oils, and the like. Also, the particular crude oil to which the concentrate is to be added may also be used alone or in combination as a solvent or diluent carrier. Most usually, combinations of these solvent or diluent carriers will be employed. Examples of low boiling solvent or diluent carriers include aromatic hydrocarbons, aliphatic hydrocarbons, chlorinated hydrocarbons, ethers, alcohols and the like such as benzene, toluene, xylene, heptane, octane, dodecane, cyclohexane, methylcyclohexane, kerosene, chlorobenzene, heptyl chloride, 1,4-dioxane, n-propyl ether, cyclohexanol, ethyl n-amyl ether as well as mixtures of two or more of these. Typically useful solvent or diluent carriers are xylene, toluene, mineral oil and combinations thereof. The concentrate may contain other additives such as rust inhibitors, antioxidants, and the like which are desired to be incorporated into the crude oils. These additional additives and their formulations into oil compositions are well known in the art.

Generally, it is preferable that the crude oil be at a temperature in the range of about 25° C. to about 95° C., preferably about 50° C. to about 60° C. to facilitate admixing the above-described esters or concentrates with such crude oils.

In accordance with this invention, the flow properties of crude oils are improved by the addition thereto of a small amount of the ester in fluidized form as described above. When the esters described above are incorporated into crude oils in sufficient amounts, the pour point, plastic viscosity and yield value of the crude oil, particularly the high wax or waxy crude oils, are reduced significantly. The reduction in the values for these properties indicates a treated crude oil having improved flow properties. The pour point of both treated and untreated crude oils can be determined by ASTM procedure D 97. Plastic viscosity and yield values of treated and untreated crude oil samples can be determined using the FANN viscometer (Model 35A with SI12 gear box) fitted with rotor, bob and spring. Plastic viscosity and yield values are important properties since these are measures of the deviation from Newtonian flow for a given fluid.

FUEL COMPOSITIONS

The normally liquid fuel compositions of this invention are generally derived from petroleum sources, e.g., normally liquid petroleum distillate fuels, though they may include those produced synthetically by the Fischer-Tropsch and related processes, the processing of organic waste material or the processing of coal, lignite or shale rock. Such fuel compositions have varying boiling ranges, viscosities, cloud and pour points, etc., according to their end use as is well known to those of skill in the art. Among such fuels are those commonly known as diesel fuels, distillate fuels, heating oils, residual fuels, bunker fuels, etc., which are collectively referred to herein as fuel oils. The properties of such fuels are well known to skilled artisans as illustrated, for example, by ASTM Specification D #396-73, available from the American Society for Testing Materials, 1916 Race Street, Philadelphia, Pa., 19103.

The fuel compositions of the invention may be prepared by merely dispersing the esters of the invention in the fuel at the desired level of concentration. Generally, depending on the fuel used, such dissolution may require mixing and some heating. Mixing may be accomplished by any of the many commercial methods, ordinary tank stirrers being adequate. Heating is generally necessary to facilitate mixing, such heating generally taking place at a temperature in the range of about 25° C. to about 95° C., preferably about 50° C. to about 60° C.

Alternatively, the esters of the invention may be blended with suitable solvents to form concentrates that can be readily dissolved in the appropriate fuel compositions at the desired concentrations. Practical considerations involved in handling such as flash point must be considered in selecting the solvent. Since the concentrates may be subjected to cold temperatures, flow at these low temperatures is also a necessary consideration. Flow characteristics are dependent upon the particular esters employed and their concentration. Substantially inert normally liquid organic diluents such as mineral oil, naphtha, benzene, toluene, xylene or mixtures thereof are preferred for forming such additive concentrates. These concentrates usually contain about 0.1% to about 90% by weight, preferably about 10% to about 70% by weight of the esters of this invention and may contain, in addition, one or more other additives known in the art.

An advantage of the esters of the present invention is that such esters are particularly suitable for imparting pour point depressant properties to fuel oils. Accordingly, the esters of the invention are provided in effective amounts to extend the versatility of such fuel oils at lower service temperatures. Generally the level of addition of such esters to such fuel oils is in the range of about 0.0002% to about 0.2% by weight, preferably from about 0.00025% to about 0.015% by weight, and advantageously about 0.003% to about 0.005% by weight.

LUBRICATING COMPOSITIONS

The esters of this invention are useful as additives for lubricants in which they function primarily as pour point depressants. Lubricating oils containing effective amounts of the esters of the invention exhibit good pour point characteristics.

The esters of the invention can be effectively employed in a variety of lubricating compositions formulated for a variety of uses. These lubricating compositions are based on diverse oils of lubricating viscosity, including natural and synthetic lubricating oils and mixtures thereof. These lubricating compositions containing the subject esters are effective as crankcase lubricating oils for spark-ignited and compression-ignited internal combustion engines, including automobile and truck engines, two-cycle engines, aviation piston engines, marine and low-load diesel engines, and the like. Also, automatic transmission fluids, transaxle lubricants, gear lubricants, metal-working lubricants, hydraulic fluids, and other lubricating oil and grease compositions can benefit from the incorporation of such esters.

Natural oils include animal oils and vegetable oils (e.g., castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins (e.g., polybutylenes, polypropylenes, propyleneisobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_3$–$C_8$ fatty acid esters, or the $C_{13}$Oxo acid diester of tetraethylene glycol.

Another suitable class of synthetic lubricating oils that can be used comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl)silicate, tetra-(p-tert-butylphenyl)silicate, hexyl-(4-methyl-2-pentoxy)disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils, either natural or synthetic (as well as mixtures of two or more of any of these) of the type disclosed hereinabove can be used in the concentrates of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

Generally the lubricants of the present invention contain an amount of one or more of the esters of this invention sufficient to provide them with improved pour point depressant properties. Normally the amount employed will be about 0.01% to about 20%, preferably about 0.1% to about 10%, more preferably about 0.1% to about 1% of the total weight of the lubricating composition.

The invention also contemplates the use of other additives in combination with the esters of this invention. Such additives include, for example, detergents and dispersants of the ash-producing or ashless type, corrosion- and oxidation-inhibiting agents, additional pour point depressing agents, extreme pressure agents, antiwear agents, color stabilizers and anti-foam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature of about 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-beta-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°-200° C.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricant compositions of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Pat. No. 1,306,529 and in many U.S. Pat. Nos. including the following: 3,163,603, 3,184,474, 3,215,707, 3,219,666, 3,271,310, 3,272,746, 3,281,357, 3,306,908, 3,311,558, 3,316,177, 3,340,281, 3,341,542, 3,346,493, 3,351,552, 3,381,022, 3,399,141, 3,415,750, 3,433,744, 3,444,170, 3,448,048, 3,448,049, 3,451,933, 3,454,607, 3,467,668, 3,501,405, 3,522,179, 3,541,012, 3,543,678, 3,542,680, 3,567,637, 3,574,101, 3,576,743, 3,630,904, 3,632,510, 3,632,511, 3,697,428, 3,725,441, 4,234,435, U.S. Pat. No. Re. 26,433.

(2) Reaction products of relatively high molecular weight aliphatic or alicyclic halides with amines, preferably olyalkylene polyamines. These may be characterized as "amine dispersants" and examples thereof are described for example, in the following U.S. Pat. Nos.: 3,275,554, 3,438,757, 3,454,555, 3,565,804.

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in the following U.S. Pat. Nos. are illustrative: 2,459,112, 2,962,442, 2,984,550, 3,036,003, 3,166,516, 3,236,770, 3,355,270, 3,368,972, 3,413,347, 3,442,808, 3,448,047, 3,454,497, 3,459,661, 3,461,172, 3,493,520, 3,539,633, 3,558,743, 3,586,629, 3,591,598, 3,600,372, 3,634,515, 3,649,229, 3,697,574, 3,725,277, 3,725,480, 3,726,882, 3,980,569.

(4) Products obtained by post-treating the carboxylic, amine or Mannich dispersants with such reagents as urea, thiourea, carbon disulfide, aldehydes, ketones, carboxylic acids, hydrocarbonsubstituted succinic anhydrides, nitriles, epoxides, boron compounds, phosphorus compounds or the like. Exemplary materials of this kind are described in the following U.S. Pat. Nos.: 3,036,003, 3,087,936, 3,200,107, 3,216,936, 3,254,025, 3,256,185, 3,278,550, 3,280,234, 3,281,428, 3,282,955, 3,312,619, 3,366,569, 3,367,943, 3,373,111, 3,403,102, 3,442,808, 3,455,831, 3,455,832, 3,493,520, 3,502,677, 3,513,093, 3,533,945, 3,539,633, 3,573,010, 3,579,450, 3,591,598, 3,600,372, 3,639,242, 3,649,229, 3,649,659, 3,658,836, 3,697,574, 3,702,757, 3,703,536, 3,704,308, 3,708,422.

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)substituted acrylates. These may be characterizeed as "polymeric dispersants" and examples thereof are disclosed in the following U.S. Pat. Nos.: 3,329,658, 3,449,250, 3,519,565, 3,666,730, 3,687,849, 3,702,300.

The above-noted patents are incorporated by reference herein for their disclosures of ashless dispersants.

Extreme pressure agents and corrosion- and oxidation-inhibiting agents which may be included in the lubricants of the invention are exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate, phosphorus esters including principally dihydrocarbon and trihydrocarbon phosphites such as dibutyl phosphite, diheptyl phosphite, dicyclohexyl phosphite, pentylphenyl phosphite, dipentylphenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Many of the above-mentioned extreme pressure agents and corrosion-oxidation inhibitors also serve as antiwear agents. Zinc dialkylphosphorodithioates are a well known example.

Additional pour point depressants can be used. These include polymethacrylates; polyacrylates; polyacrylamides; condensation products of haloparaffin waxes and aromatic compounds; vinyl carboxylate polymers; and terpolymers of dialkylfumarates, vinyl esters of fatty acids and alkyl vinyl ethers. Pour point depressants that are useful, techniques for their preparation and their uses are described in U.S. Pat. Nos. 2,387,501; 2,015,748; 2,655,479; 1,815,022; 2,191,498; 2,666,746; 2,721,877; 2,721,878; and 3,250,715 which are hereby incorporated by reference for their relevant disclosures.

Anti-foam agents are used to reduce or prevent the formation of stable form. Typical anti-foam agents include silicones or organic polymers. Additional anti-foam compositions are described in "Foam Control Agents", by Henty T. Kerner (Noyes Data Corporation, 1976), pages 125-162.

The esters of the invention can be added directly to the lubricant. Preferably, however, the esters are diluted with a substantially inert, normally liquid diluent such as mineral oil, naphtha, benzene, toluene or xylene to form an additive concentrate. These concentrates usually contain from about 0.1% to about 90%, preferably about 10% to about 70% by weight of one or more of the esters of this invention. These concentrates may also contain one or more of the above-discussed lubricant additives.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An ester of a carboxy-containing interpolymer said interpolymer having an RSV of from about 0.05 to about 2, the ester group of said interpolymer being
   (A) a carboxylic ester group having at least 8 aliphatic carbon atoms in the ester group with the proviso that if the ester group (A) contains less than 28 carbon atoms, the interpolymer ester includes an ester (B) wherein (B) is a carboxylic ester group having an ester group of the formula

wherein R is a hydrocarbyl group of about 1 to about 50 carbon atoms, R' is a hydrocarbyl group of about 1 to about 50 carbon atoms, y is a number in the range of zero to about 50 and z is a number in the range of zero to about 50 with the proviso that both y and z cannot be zero, wherein when (B) is present the molar ratio of (A):(B) is in the range of about 100:1 to about 1:2.

2. The ester of claim 1 wherein said interpolymer is derived from at least two monomers, (i) one of said monomers being at least one aliphatic olefin monomer or a vinyl aromatic monomer, and (ii) the other monomer being at least one alpha, beta-unsaturated aliphatic acid, anhydride or ester thereof wherein said interpolymer has an RSV in the range of about 0.1 to about 2.

3. The ester of claim 2 wherein said interpolymer has an RSV in the range of about 0.2 to about 0.9.

4. The ester of claim 2 wherein said interpolymer has an RSV in the range of about 0.35 to about 0.7 and wherein said vinyl aromatic monomer is styrene or a substituted styrene.

5. The ester of claim 2 wherein said aliphatic olefin is an alpha olefin of about 2 to about 30 carbon atoms, and wherein said aliphatic olefin is selected from the group consisting of ethylene, propylene or 1-butene.

6. The ester of claim 1, wherein the ester group (A) contains 28 to 48 carbon atoms and the ester group (B) is present.

7. The ester of claim 8 wherein the ester group (A) contains 28 to 48 carbon atoms and the ester group (B) is present and R is aliphatic and has about 4 to about 30 carbon atoms, R' is methyl, y is a whole number in the range of about 1 to about 30, and z is a number in the range of about 1 to about 30.

8. The ester of claim 2 wherein said alpha, betaunsaturated aliphatic acid, anhydride or ester is selected from the group consisting of maleic acid, maleic anhydride, itaconic acid, itaconic anhydride, acrylic acid, methacrylic acid, or ester of any of the foregoing.

9. The ester of claim 1 wherein said interpolymer is derived from styrene and maleic anhydride.

10. The ester of claim 2 wherein the mole ratio of (i):(ii) is in the range of about 1:2 to about 3:1.

11. The ester of claim 1 wherein at least about 50% of the carboxy groups of said interpolymer are esterified.

12. The ester of claim 1 wherein substantially all of the carboxy groups of said interpolymer are esterified.

13. The ester of claim 1 wherein the ester group of said first carboxylic acid ester (A) has from about 12 to about 30 carbon atoms.

14. The ester of claim 1 wherein at least about 50 molar percent of the ester groups of said first carboxylic ester group (A) have from about 16 to about 30 carbon atoms, ester group (B) is present and R is aliphatic and contains 12 to 24 carbon atoms.

15. The ester of claim 1 wherein at least about 50% of the carboxy groups of said interpolymer are esterified.

16. The ester of claim 6, wherein substantially all of the carboxy groups of said interpolymer are esterified.

17. The ester of claim 1 wherein R is aliphatic and has about 12 to about 18 carbon atoms, y is zero and z is a number in the range of 1 to about 5.

18. The ester of claim 1 wherein the interpolymer is further modified to include an ester group (C), the ester group (C) having no more than 7 aliphatic carbon atoms.

19. The ester of claim 15 wherein the interpolymer is further modified to include an ester group (C), the ester group (C) having no more than 7 aliphatic carbon atoms.

20. The ester of claim 1 wherein the interpolymer is further modified to include an ester group (C), the ester group (C) having no more than 7 aliphatic carbon atoms.

21. The ester of claim 6 wherein the interpolymer is further modified to include an ester group (C) the ester groups (C) having no more than 7 aliphatic carbon atoms.

22. The ester of claim 1 wherein the ester group (B) is present and R is aliphatic and has about 4 to about 30 carbon atoms, R' is methyl, y is a number in the range of about 1 to about 8, and z is a number in the range of about 1 to about 8.

23. The ester of claim 21 wherein the interpolymer is further modified the molar ratio of (A):(B):(C) is about (30-99):(1-70):(1-20).

24. The ester of claim 21, wherein the molar ratio of (A):(B) is about 10:1 to about 3:1.

25. The ester of claim 1 wherein the interpolymer is further modified the molar ratio of (A):(B):(C) is about (30-99):(1-70):(0-20).

26. The ester of claim 1 wherein the molar ratio of (A):(B) is in the range of about 20:1 to about 1:1.

27. The ester of claim 1 wherein the molar ratio of (A):(B) is in the range of about 10:1 to about 3:1.

28. A concentrate comprising a substantially inert normally liquid diluent and from about 0.1 to about 90% by weight of the ester of claim 1.

29. A crude oil composition comprising a major amount of crude oil and a minor flow-improving amount of the ester of claim 1.

30. A fuel composition comprising a major amount of a normally liquid fuel and a minor flow-improving amount of the ester of claim 1.

31. The ester of claim 1, wherein the interpolymer is also esterified with an ester group containing 16-24 carbon atoms.

32. The ester of claim 6, wherein the interpolymer is also esterified with an ester group containing 16-24 carbon atoms.

* * * * *